(12) United States Patent
Olver et al.

(10) Patent No.: US 8,757,540 B2
(45) Date of Patent: Jun. 24, 2014

(54) NACELLE INLET LIP

(75) Inventors: Bryan W. Olver, Nobleton (CA); Ljubisa Vrljes, Etobicoke (CA)

(73) Assignee: Pratt & Whitney Canada Corp., Longueuil, QC, (CA)

( * ) Notice: Subject to any disclaimer, the term of this patent is extended or adjusted under 35 U.S.C. 154(b) by 663 days.

(21) Appl. No.: 12/164,460

(22) Filed: Jun. 30, 2008

(65) Prior Publication Data
US 2009/0321585 A1 Dec. 31, 2009

(51) Int. Cl.
B64D 33/02 (2006.01)

(52) U.S. Cl.
USPC ...................................................... 244/53 B

(58) Field of Classification Search
USPC .... 244/53 B, 53 R, 57, 134 R, 134 B, 234 D; 60/39.091, 39.093, 226.1
See application file for complete search history.

(56) References Cited

U.S. PATENT DOCUMENTS

| | | | |
|---|---|---|---|
| 3,397,855 A * | 8/1968 | Newland | 248/554 |
| 3,802,245 A | 4/1974 | Garner et al. | |
| 5,035,133 A | 7/1991 | White et al. | |
| 5,297,765 A | 3/1994 | Hughes et al. | |
| 5,388,440 A | 2/1995 | Folmer | |
| 6,027,078 A * | 2/2000 | Crouch et al. | 244/204 |
| 6,079,670 A | 6/2000 | Porte | |
| 6,328,258 B1 * | 12/2001 | Porte | 244/53 B |
| 6,708,711 B2 | 3/2004 | Surply et al. | |
| 6,837,459 B2 | 1/2005 | Gonidec et al. | |
| 6,866,223 B2 | 3/2005 | Chevalier | |
| 6,955,283 B2 | 10/2005 | Kendall et al. | |
| 7,121,128 B2 | 10/2006 | Kato et al. | |
| 7,210,611 B2 | 5/2007 | Sanders et al. | |
| 7,266,941 B2 | 9/2007 | Eleftheriou et al. | |
| 7,383,679 B2 | 6/2008 | Porte et al. | |
| 2004/0226333 A1 | 11/2004 | Kato et al. | |
| 2005/0218261 A1 * | 10/2005 | Porte et al. | 244/53 B |
| 2006/0249560 A1 | 11/2006 | Pitt et al. | |
| 2007/0186612 A1 | 8/2007 | Stewart | |
| 2008/0179448 A1 * | 7/2008 | Layland et al. | 244/1 N |

* cited by examiner

Primary Examiner — Timothy D Collins
Assistant Examiner — Brian M O'Hara
(74) Attorney, Agent, or Firm — Norton Rose Fulbright Canada LLP

(57) ABSTRACT

A nacelle inlet lip has a simplified geometry. The nacelle inlet lip has a constant cross-section all along a circumference thereof and is wholly concentric relative to the engine centerline, thereby allowing for the use of simple and economical manufacturing processes.

10 Claims, 3 Drawing Sheets

NACELLE INLET LIP

TECHNICAL FIELD

The application relates generally to gas turbine engines and, more particularly, to the inlet lip of a turbofan engine nacelle.

BACKGROUND OF THE ART

Gas turbine engine nacelles typically have a bottom eccentric hollow space or loft which bulges radially outwardly with respect to the engine centerline in order to accommodate engine accessories. To conform to the eccentric geometry of the nacelle, the inlet lip, which is mounted to the forward end of the nacelle, is formed as an asymmetric part having a constantly changing curvature along the circumference thereof. This results in expensive and complex manufacturing processes.

Accordingly, there is a need to simplify the nacelle inlet lip geometry.

SUMMARY

In one aspect, there is provided a nacelle inlet for a turbofan engine having an engine centerline, comprising an annular inlet lip concentric relative to the engine centerline, the annular inlet lip having a constant cross-section all along a circumference thereof, the annular inlet lip having an external surface and an internal surface joined by a rounded leading edge, the external surface being spaced radially outwardly from the internal surface relative to the engine centerline, the external surface being axially shorter than the internal surface, and a forwardly canted bulkhead extending between said external surface and said internal surface.

In a second aspect, there is provided a nacelle surrounding a turbofan engine having an engine centerline, the nacelle comprising an inlet duct section having a nacelle external surface and a nacelle internal surface defining an annular cavity therebetween, the nacelle external surface having a bottom eccentricity relative to the engine centerline to provide for the formation of a radially outwardly bulging loft in a bottom portion of the nacelle for accommodating engine accessories; and an inlet lip projecting forwardly from said inlet duct section, said inlet lip being concentric relative to the engine centerline and having a constant cross-section along all a circumference thereof, the inlet lip having ah inlet lip external surface and an inlet lip internal surface joined by a rounded edge forming a leading edge of the nacelle, the inlet lip internal and external surfaces respectively blending with said nacelle internal and external surfaces.

DESCRIPTION OF THE DRAWINGS

Reference is now made to the accompanying figures, in which.

DETAILED DESCRIPTION OF THE PREFERRED EMBODIMENTS

Figure 1:
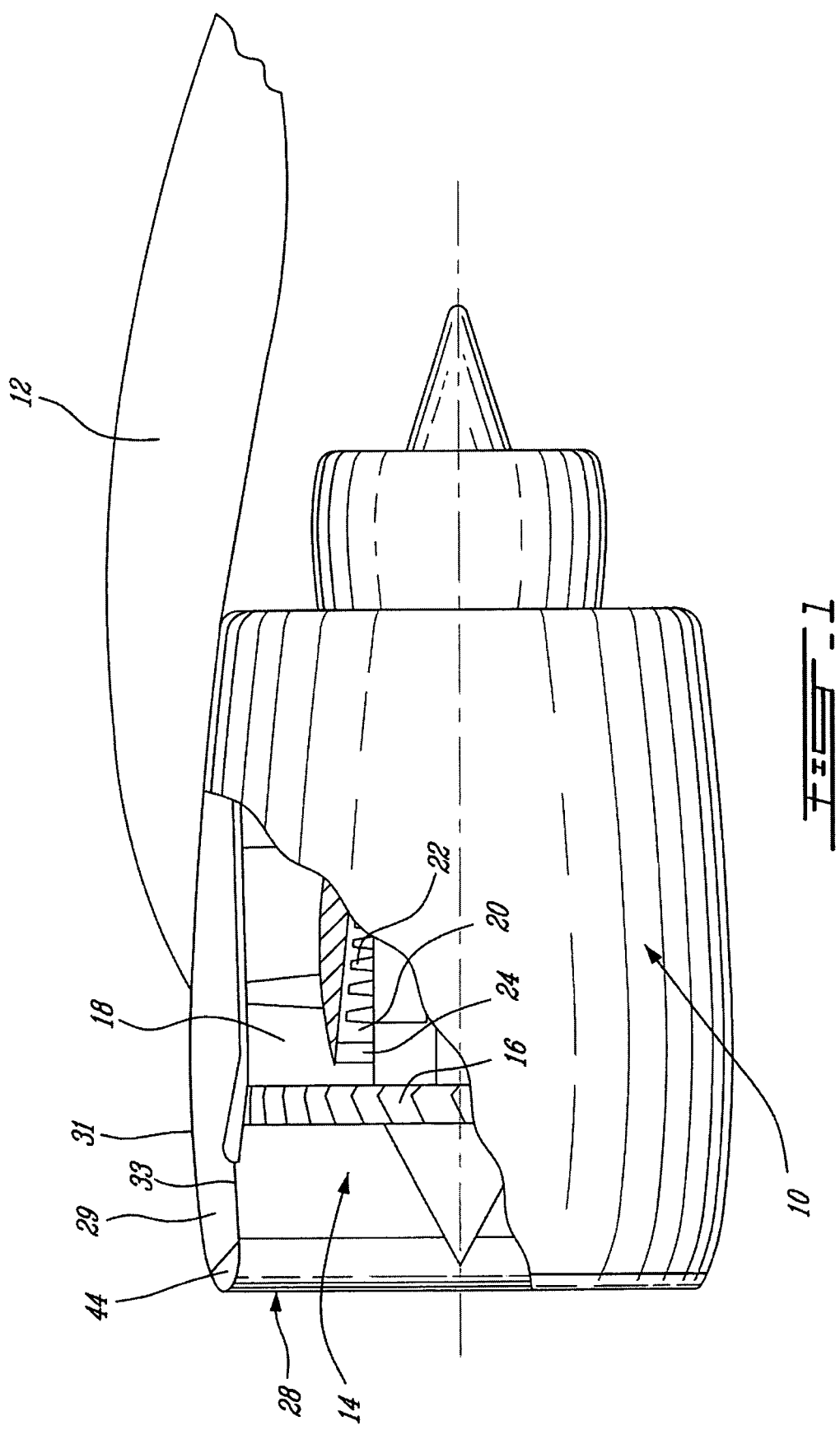
FIG. 1 is a partially sectioned side elevation schematic of an aircraft engine mounted within a nacelle having a symmetrical inlet lip wholly concentrically disposed about the engine centerline.

Referring to FIG. 1, a nacelle 10 of an aircraft power plant 14 is fixed to a mounting structure 12 of an aircraft (hot shown). The power plant 14 is described herein as a gas turbine engine, and more particularly as a turbofan, however the exemplary nacelle inlet lip that will be described hereinafter can be used with other suitable aircraft power plant. The turbo fan engine 14, as illustrated in FIG. 1, has an upstream fan 16 that provides, initial compression of the engine inlet airflow which is subsequently split into the outer annular bypass airflow passage 18 and the inner annular engine core airflow passage 20. Generally, inlet guide varies 24 are disposed at least within the engine core airflow passage 20, upstream of the next compressor stage 22.

The nacelle 10 is generally tubular and has an external surface 31 and an internal surface 33 radially spaced apart to define a hollow cavity 29 therebetween. The external and internal surfaces can be made of sheet metal. As can be appreciated from FIG. 2, the hollow cavity 29 has a substantially greater cross-section at the lower portion of the nacelle 10. This provides an eccentric lower nacelle loft 34 designed to accommodate engine accessories, such as pumps, gear and lubricating systems (not shown). This extra internal volume is obtained by causing the nacelle external surface 31 to bulge radially outwardly with respect to the centerline axis of the engine 14 in the bottom region of the nacelle 10. The external tubular surface 31 of the nacelle 10 is thus eccentric relative to the engine centerline (i.e. it has a variable curvature along its circumference). In contrast, the circumferential internal surface 33 of the nacelle 10 is concentric relative to the engine centerline and defines the air inlet flow passage to the engine at the upstream end thereof, and defines the annular bypass airflow passage 18 further downstream.

Figure 2:
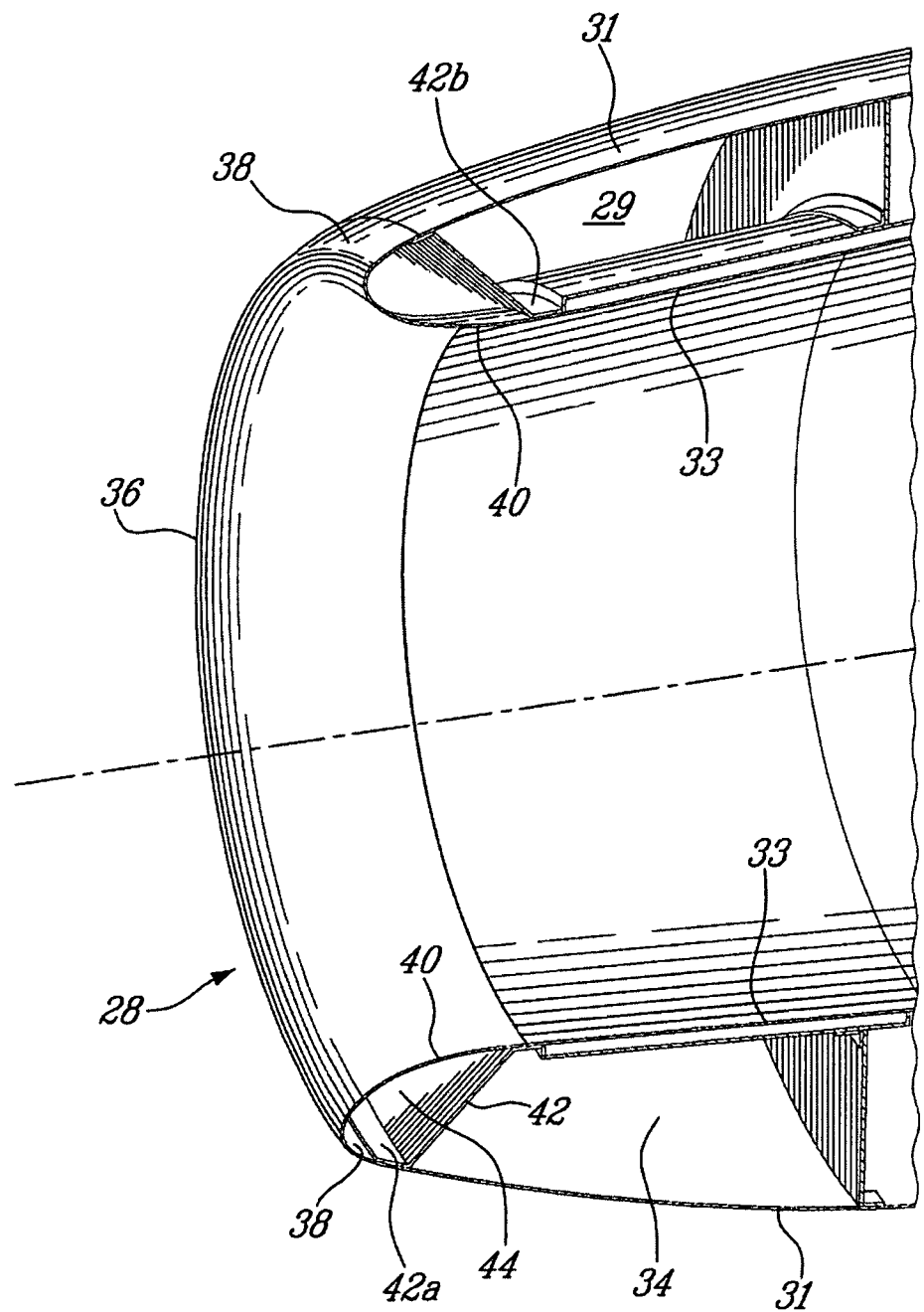
FIG. 2 is an enlarged cross-sectional isometric view of the inlet lip mounted to an inlet duct section of the nacelle.
Figure 3:
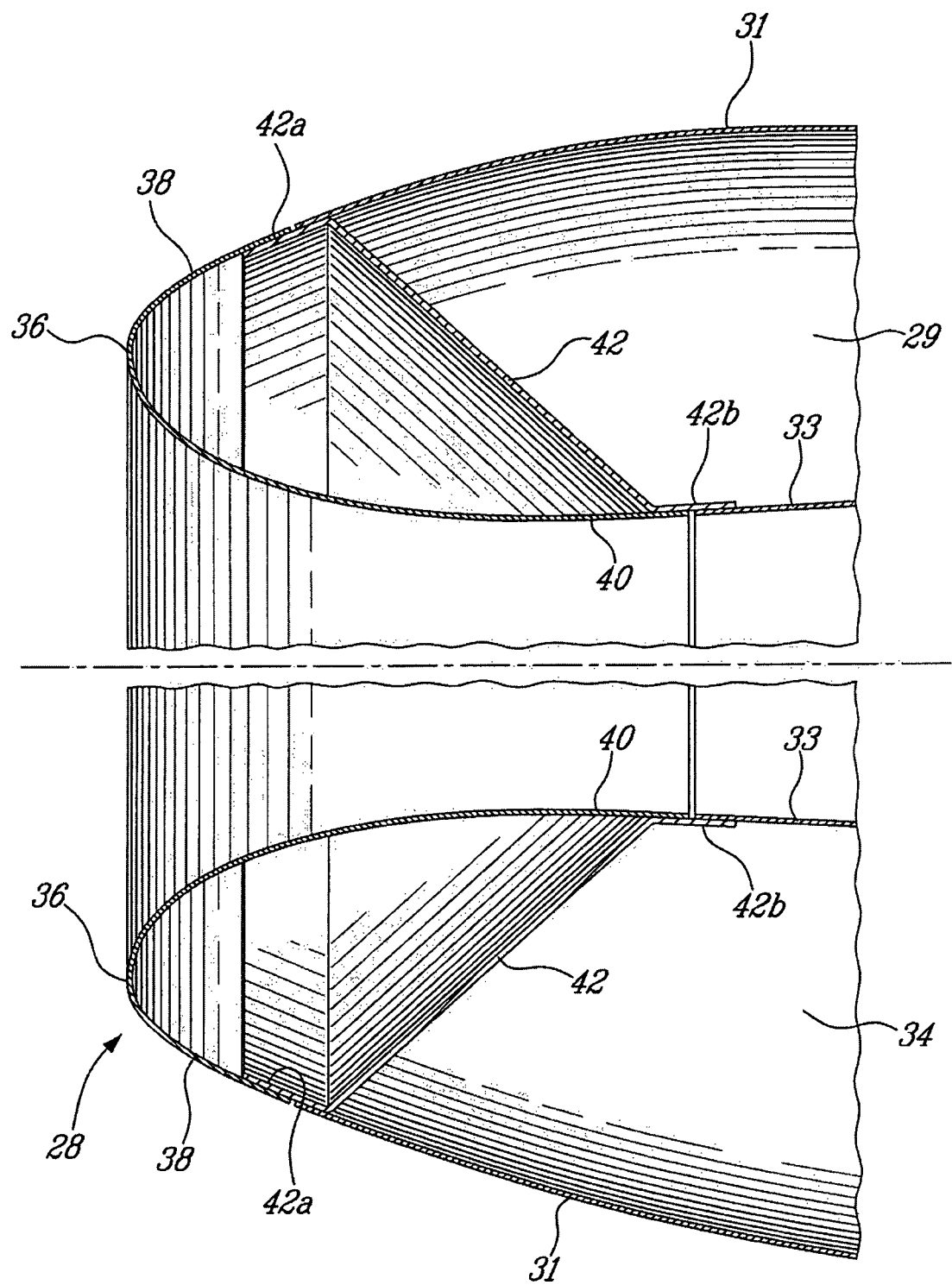
FIG. 3 is a cross-sectional view of the nacelle inlet lip.

An annular inlet lip 28 is mounted to the most upstream end of the nacelle inlet duct section shown in FIG. 2. The inlet lip 28 defines the engine air inlet and is coaxial with the engine centerline. As can be appreciated from FIGS. 2 and 3, the inlet lip 28 has a substantially C-shaped or rearwardly open cross-section defined by an aerodynamic external surface 38, an aerodynamic internal surface 40 spaced radially inwardly from the external surface 38, and a rounded leading edge 36 integrally interconnecting the external and internal surfaces 38, 40. The inlet lip external surface 38 provides a smooth forward extension of the nacelle external surface 31. Likewise, the inlet lip internal surface 40 provides a smooth forward extension of the nacelle internal surface 33 for channeling incoming air to the engine 14.

While the nacelle external and internal surfaces 31 and 40 define an eccentric bottom portion (i.e. the outwardly bulging loft 34), the inlet lip 28 is wholly concentric with respect to the engine centerline (the nacelle inlet lip 28 has a constant cross-section all along its circumference). Blending of the inlet lip external surface 38 with the nacelle external surface 31, which respectively have a constant and a variable curvature in a circumferential direction, is rendered possible in part by the short axial profile of the inlet lip external surface 38. As can be appreciated from FIGS. 2 and 3, the inlet lip external surface 38 is substantially axially shorter than the internal lip surface 40. The inlet lip shortened external surface 38 is interrupted in a curved portion having a tangent angled to the centerline of the engine, whereas the inlet lip internal surface 40 ends in a substantially axially straight portion nearly parallel to the engine centerline. The inlet lip external surface 38 ends short after the rounded edge 36 at a forward location where the inlet lip starts to describe a curve from radial to axial. In this manner, the length of the external surface 38 of the lip may be shortened by approximately 70% of the axial length of the lip internal surface 40.

By so forwardly shifting the interface or junction between the inlet lip external surface 38 and the nacelle external surface 31 closer to the rounded leading edge 36 that is in a curved lip region which still has a substantial radial component as opposed to only or close to only an axial component, it is possible to slightly change the curvature of the nacelle in the axial direction all along the circumference thereof so that the top and bottom parts of the nacelle external surface 31 be substantially tangent to the inlet lip external surface 38. In this way the eccentric nacelle lower loft 34 can reasonably blend with the concentric inlet lip 28.

The rear end portion of the inlet lip external and internal surfaces 38 and 40 is connected to the nacelle external and internal surfaces 31 and 33 by means of a forwardly canted annular bulkhead 42. The bulkhead 42 closes the open-rear end of the inlet lip 28 so as to define therewith an anti-icing cavity 44 adapted to receive an anti-icing system (not shown). The bulkhead 42 can be provided at opposed ends thereof with flanges 42a and 42b to facilitate the attachment of the inlet lip 28 to the nacelle external and internal surfaces 31 and 33. The radially outer flange 42a extends forwardly to interconnect the shortened inlet lip external surface 38 to the nacelle external surface 31. The radially inner flange 42b extends rearwardly to interconnect the inlet lip internal surface 40 to the nacelle internal surface 33. Like the inlet lip 28, the bulkhead 42 is wholly concentric with respect to the engine centerline. The inlet lip 28 and the bulkhead 42 can thus be economically formed by standard spinning techniques, and where required, polishing for the inlet lip 28 is also simplified. Indeed, symmetrical rotation allows for ease of manufacture. Accordingly, sheet material such as high temperature aluminium or stainless steel can be use to spin form a wholly concentric one-piece inlet lip.

The forwardly canted bulkhead 42 also provides improved birdstrike survivability. The short inlet lip outer surface design together with the forwardly canted bulkhead 42 contributes to reduce the volume to be heated for the purposes of de-icing the inlet lip 28. The volume of the anti-icing cavity 44 is indeed small as compared to the volume of a conventional inlet lip anti-icing cavity. The forward trimming of the inlet lip outer surface also result in weight savings and reduced polishing area.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A nacelle inlet for a turbofan engine having an engine centerline, comprising an annular inlet lip mounted to an inlet section of the nacelle, the annular inlet lip being made from a single continuous piece of material separate from that of the inlet section, the annular inlet lip being concentric relative to the engine centerline, the annular inlet lip having a constant cross-section all along a circumference thereof, the annular inlet lip having an external surface and an internal surface joined by a rounded leading edge, the external surface being spaced radially outwardly from the internal surface relative to the engine centerline, the external surface being axially shorter than the internal surface, and a forwardly canted conical bulkhead extending between said external surface and said internal surface and defining with the annular inlet lip an anti-icing cavity, wherein said inlet section of the nacelle has an external surface and an internal surface, the external surface of the inlet section of the nacelle being connected to the external surface of the inlet lip along a first joint, the internal surface of the inlet section of the nacelle being connected to the internal surface of the inlet lip along a second joint, the first joint being located axially forwardly of the second joint, wherein said forwardly canted conical bulkhead has a radially outer end provided with a forwardly projecting flange spanning the first joint and a radially inner end provided with a rearwardly projecting flange spanning the second joint, and wherein the forwardly canted conical bulkhead has a conical wall extending between the radially outer and inner ends thereof, and wherein the entirety of said conical wall is disposed axially rearwardly from said first joint.

2. The nacelle inlet defined in claim 1, wherein said annular inlet lip projects forwardly from the inlet section of the nacelle, and wherein said inlet lip is joined to said inlet section via said forwardly canted bulkhead.

3. The nacelle inlet defined in claim 1, wherein a tangent to a rear end of said external surface of the annular inlet lip is angled to said centerline axis.

4. The nacelle inlet defined in claim 1, wherein the outer surface of the annular inlet lip ends in a curved portion adjacent to the rounded leading edge.

5. The nacelle defined in claim 1, wherein the length of the external surface of the lip is at least about 70% shorter than an axial length of the internal surface of the lip.

6. A nacelle surrounding a turbofan engine having an engine centerline, the nacelle comprising an inlet duct section having a nacelle external surface and a nacelle internal surface defining an annular cavity therebetween, the nacelle external surface having a bottom eccentricity relative to the engine centerline to provide for the formation of a radially outwardly bulging loft in a bottom portion of the nacelle for accommodating engine accessories; a separate one-piece inlet lip projecting forwardly from said inlet duct section, said inlet lip being concentric relative to the engine centerline and having a constant cross-section along all a circumference thereof, the inlet lip having an inlet lip external surface and an inlet lip internal surface joined by a rounded edge forming a leading edge of the nacelle, the inlet lip internal and external surfaces respectively blending with said nacelle internal and external surfaces, said inlet lip external surface being shorter than said inlet lip internal surface, a forwardly canted conical bulkhead having a forwardly projecting outer flange joining the inlet lip external surface to the nacelle external surface and a rearwardly projecting inner flange joining the inlet lip internal surface to the nacelle internal surface, the forwardly canted conical bulkhead closing an aft end of the inlet lip and defining therewith and anti-icing cavity, and wherein the forwardly canted conical bulkhead has a conical wall extending between the radially outer and inner ends thereof, and wherein the entirety of said conical wall is disposed axially rearwardly from said first joint.

7. The nacelle defined in claim 6, wherein said inlet lip external surface extends aft of the rounded edge to a forward location where the inlet lip starts to describe a curve from radial to axial.

8. The nacelle defined in claim 6, wherein said forwardly canted bulkhead is wholly concentric relative to the engine centerline.

9. The nacelle defined in claim 6, wherein said inlet lip consists of a single piece of sheet material.

10. The nacelle defined in claim 6, wherein the length of the external surface of the lip is at least about 70% shorter than an axial length of the internal surface of the lip.

* * * * *